N. WHITTEN.
Car Coupling.

Patented May 5, 1868.

Witnesses.
Geo. M. Weston
Fred. H. Coombs

Inventor.
Nathan Whitten

United States Patent Office.

NATHAN WHITTEN, OF ETNA, MAINE.

Letters Patent No. 77,558, dated May 5, 1868.

IMPROVED CAR-COUPLING.

*The Schedule referred to in these Letters Patent and making part of the same.*

TO ALL WHOM IT MAY CONCERN:

Be it known that I, NATHAN WHITTEN, of Etna, in the county of Penobscot, and State of Maine, have invented a new and useful Improvement in Car-Couplings; and I do hereby declare that the following is a full, clear, and exact description thereof, which will enable others skilled in the art to make and use my invention, reference being had to the accompanying drawings, and to the letters of reference marked thereon, of which said drawings—

Figure 3 is a sectional view of the upper half of the draw-head and draught-bar—

Figure 1:
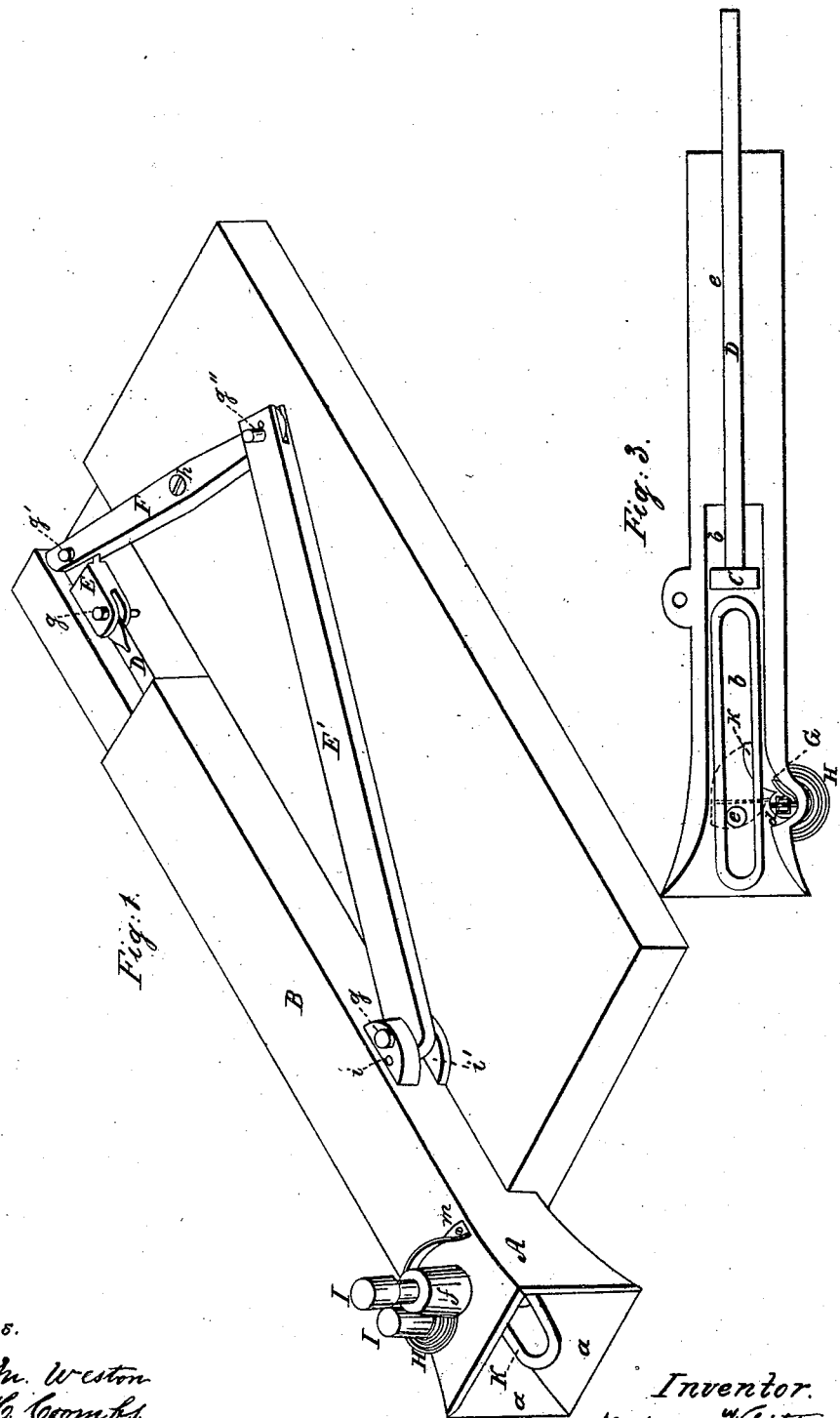
Figure 1 is a perspective view of my invention.

All showing the application of my improvement; and in which said drawings—

A is a draw-head; B is a draught-bar; C is a plunger-head; D is a plunger-rod; E is a sweep; F is a lever; F' is a bar; G is a pivot-plate; H is a coil-spring; I is a shackling-pin; and K is a shackling-link. $a$ is a flanging-mouth of the draw-head; $b$ is a chamber in the draught-bar; $c$ is a perforated passage through the draught-bar; $d$ is a recess in the draw-head; $e$ and $e'$ are circular apertures or pin-holes; $f$ is an upright collar; $g$, $g'$, $g''$, and $g'''$ are bolts or rivets; $h$ is a fulcrum-bolt; $i$ and $i'$ are spurs; $k$ is a flange; $l$ is a pivot-pin; and $m$ is a bolt or pin.

I construct the draw-head A and draught-bar B in one piece, and commonly of the ordinary size and material, and secure the same to the car-platform, or beneath the car, in the usual manner.

I provide the draw-head and draught-bar with a flanging-mouth, $a$, terminating in the chamber $b$, in which plays the plunger-head C; and with the perforated passage $c$, in which plays the plunger-rod D; and with the recess $d$, in which plays the pivot-plate G; and with circular apertures, in which plays the pivot-pin I; and with the circular apertures $e$ and $e'$, and upright collar $f$, in which plays the shackling-pin I.

I construct the plunger-head C of cast iron, or other suitable material, and of such size and shape that it will play freely in the chamber $b$; and I secure the plunger-head to the plunger-rod D, by a male and female screw, or in any permanent manner.

I construct the plunger-rod D of steel, or other suitable material, and pass the plunger, rod foremost, through the mouth $a$, chamber $b$, and perforated passage $c$, until the end of the rod projects through the rear of the draught-bar B, and I then connect the plunger with the sweep E, by a pivotal rivet, or bolt and nut $g$, or by a screw-link.

I construct the sweep E of wrought iron, or other suitable material, and connect the same with the lever F, by the pivotal rivet, or bolt and nut $g'$.

I construct the lever F of wrought iron, or other suitable material, and connect the same with the bar F', by the pivotal rivet, or bolt and nut $g''$.

I construct the bar F' of wrought iron, or other suitable material, and secure the same to the draught-bar B, by means of the spurs $i$ and $i'$, and the pivotal rivet, or bolt and nut $g'''$.

I construct the pivot-plate G of steel, or other suitable material, and provide the same with a flange, $k$; said pivot-plate being of such size and shape as to form, when sprung forward, a diaphragm across the entrance of the chamber $b$, and a stop or bottom to the aperture or pin-hole $e$, as shown by dotted lines in fig. 3, and I secure the pivot-plate in the recess $d$, by means of the pivot-pin $l$, part of the shaft of which is squared for the purpose.

I provide the coil-spring H, and attach one end of the same to the head of the pivot-pin $l$, and the other end to the draught-bar B, by means of a bolt or pin, $m$; all as shown in the accompanying drawings.

I also provide the ordinary shackling-pin I and shackling-link K; said shackling-link K being usually one-fourth the length of the combined draw-head and draught-bar.

For the purpose of explaining the operation of my improvement, I will suppose two cars approaching each other to be coupled together, and for convenience I will designate the cars as X and Y. The shackling-link and other parts of the apparatus on the car X being then in the relative position shown in figs. 1 and 2, and the shackling-pin I, of the car Y, being withdrawn far enough to allow the pivot-plate G to be sprung forward by the coil-spring H, and to close the entrance of the chamber $b$, and to stop the pin-hole $c$ with the flange $k$, and the shackling-pin I standing in the upright collar $f$, and sustained in that position by the flange $k$.

Then, when the draw-heads meet, and are pressed together by the momentum of the moving car, which may be either car, the draught-bar B, of the car X, is pushed back, and as it recedes, the bar F' throws back the short arm of the lever F, which lever F oscillates on the fulcrum $h$. The long arm of the lever F is thrown forward twice as far as the short arm is thrown back. The oscillating motion of the lever F is converted into rectilinear motion, by means of the sweep E. The plunger C D is thrown forward, strikes the shackling-link K, and projects the same into the mouth $a$, of the draw-head A, of the car Y. The shackling-link K then presses back the pivot-plate, in the entrance of the chamber $b$, in the draught-bar of the car Y, so that the flange $k$, in the recess $d$, in the draw-head of the car Y, no longer sustains the shackling-pin, which pin then drops through the aperture $e$, the shackling-link K, and the aperture $e'$, in the draw-head of the car Y, and the cars are coupled together.

Figure 2:
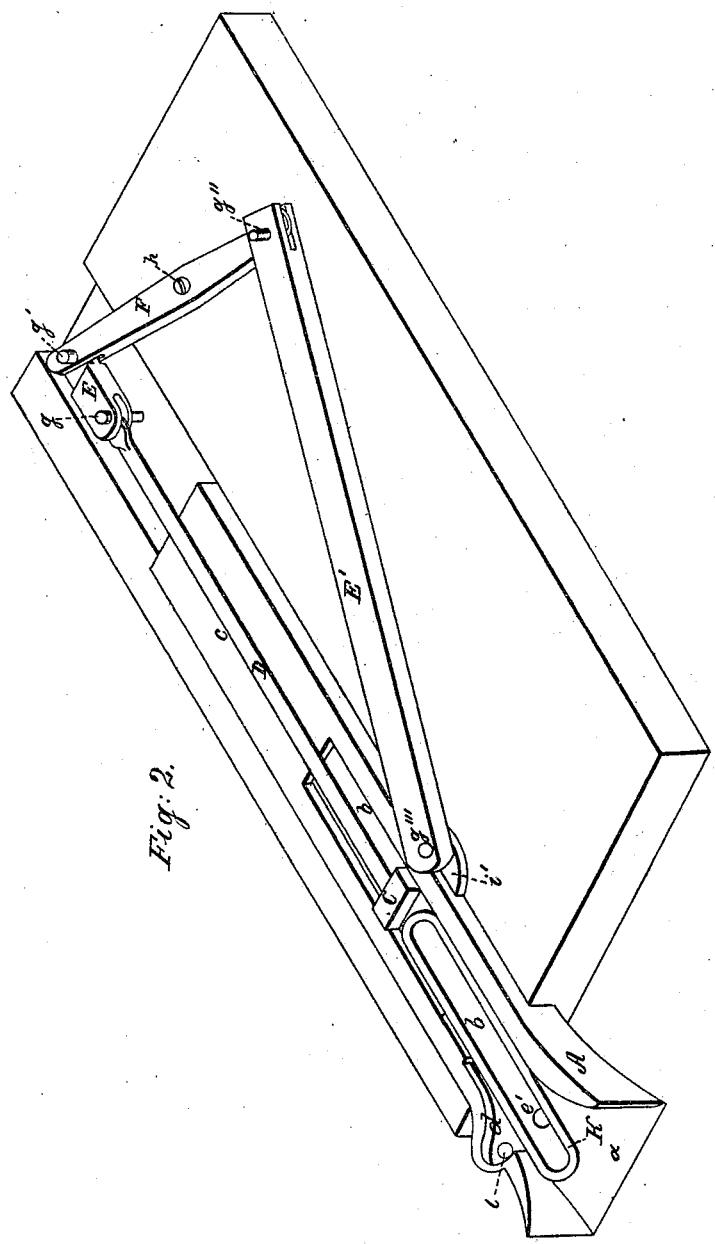
Figure 2 is a perspective sectional view of the lower half of the draw-head and draught-bar.

One peculiar advantage of this invention for coupling cars is, that the link K is held in a horizontal position, and entirely within the draw-head and draught-bar of the car X, as shown in figs. 1 and 2, until the draw-heads meet, and then when the shackling-link is projected by the plunger C D, in the draught-bar of car X, the flanging mouth of the draw-head, on the car Y, is certain to receive the link, if the draw-heads are near enough to the same plane to be coupled at all; and as soon as the cars are coupled, and the car X is drawn ahead, the link has as much vertical and lateral play as, if not more than, in ordinary draw-heads.

Crooked links may be used to the same advantage with my improvement as with the ordinary draw-heads, and where it is not important that the cars should be close together, for instance, freight-cars, the compound levers F F' and sweep E may be dispensed with, and the plunger may be thrown forward, when the draught-bar recedes, by means of an immovable stop, cushion, or other contrivance of like nature, in the rear of the plunger.

What I claim as my invention, and desire to secure by Letters Patent, is—

The combined lever F, bar F', and sweep E, secured to the draught-bar B, to the car-floor, and to the plunger-rod D, for the purpose of giving a forward rectilinear and increased motion to the plunger C D, when the draught-bar is forced backward, all for the purposes and in the manner as shown and described.

NATHAN WHITTEN.

Witnesses:
L. H. WHITTEN,
SAMUEL HASTY.